May 17, 1932.   G. E. OSBORNE   1,858,340
PHOTOGRAPHIC EXPOSURE METER
Filed June 18, 1929   3 Sheets-Sheet 1
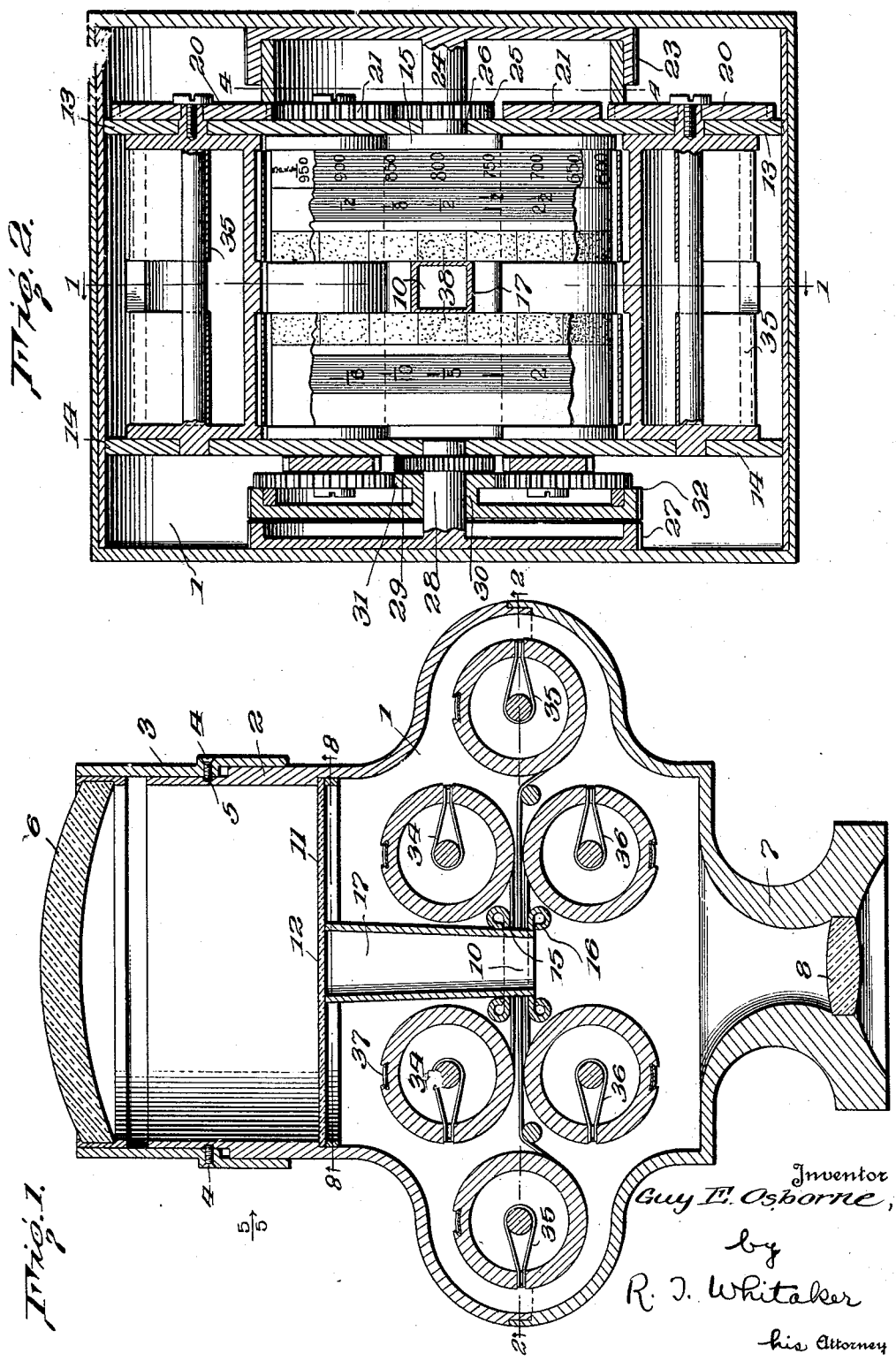

May 17, 1932. G. E. OSBORNE 1,858,340
PHOTOGRAPHIC EXPOSURE METER
Filed June 18, 1929  3 Sheets-Sheet 2
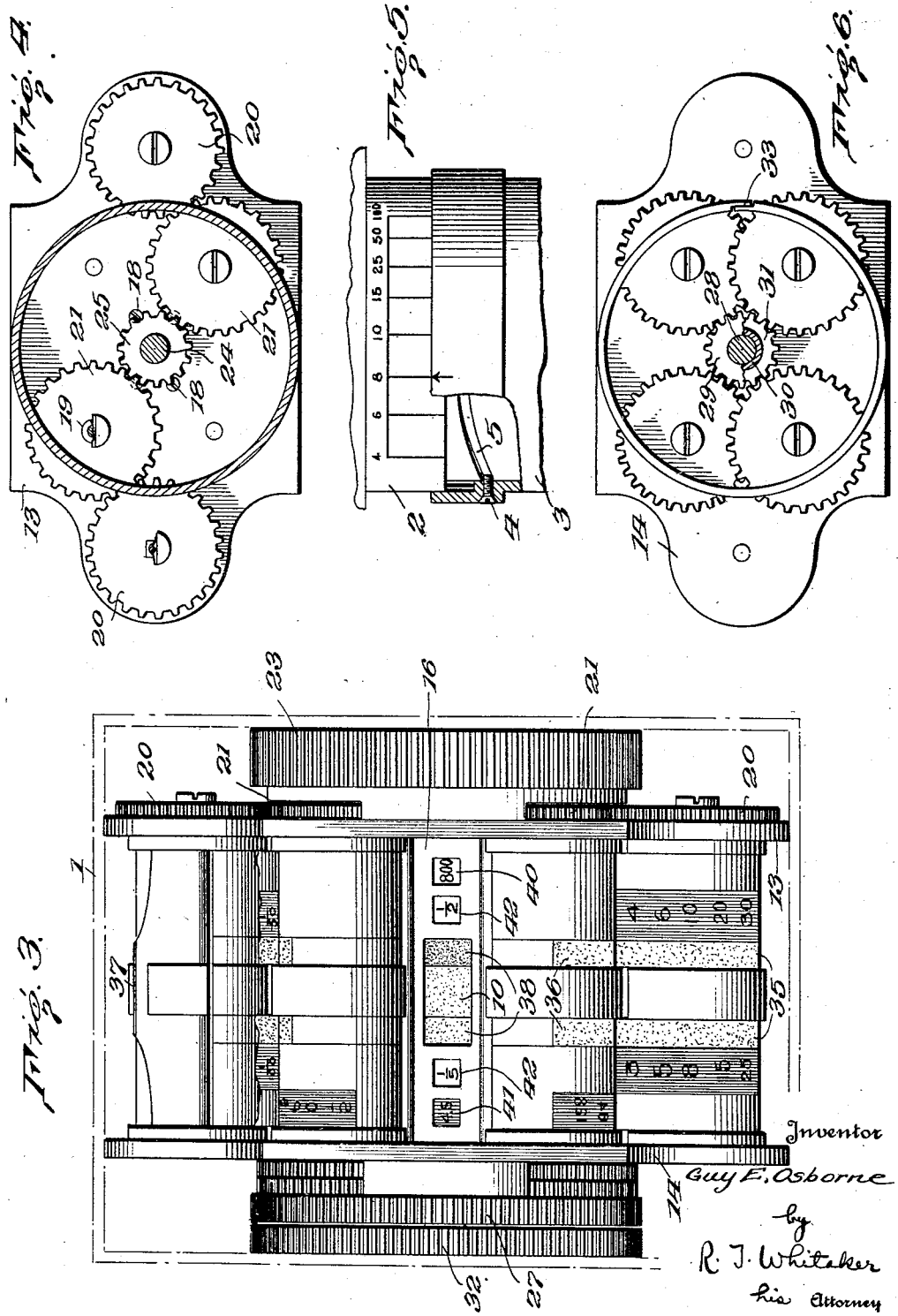

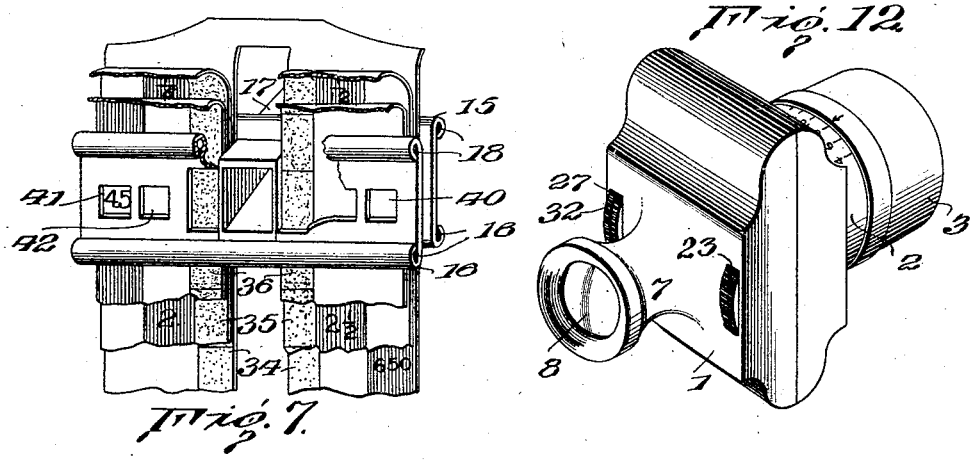
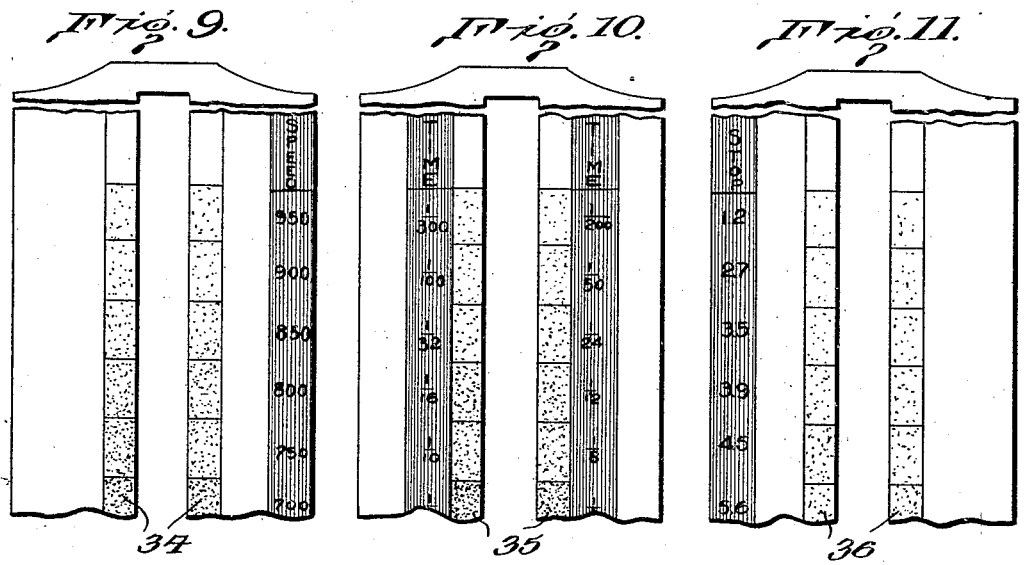
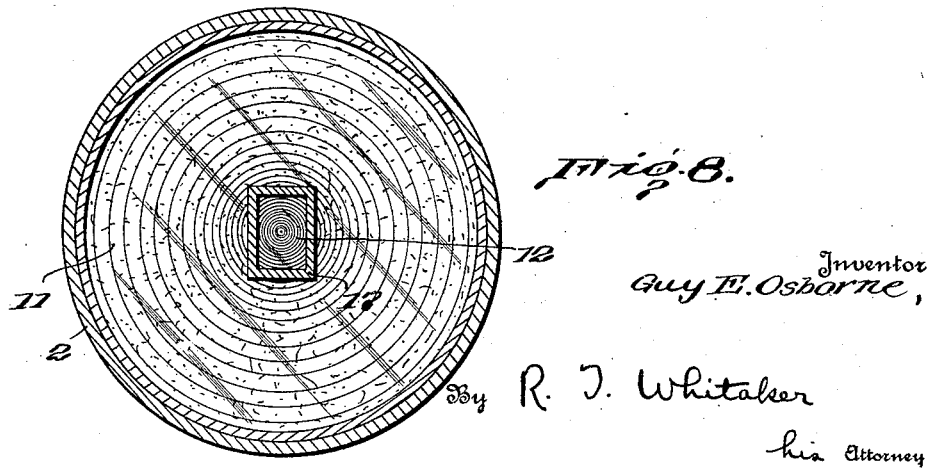

Patented May 17, 1932

1,858,340

UNITED STATES PATENT OFFICE

GUY E. OSBORNE, OF CHAUNCEY, OHIO, ASSIGNOR OF ONE-TENTH TO HARRY B. NOBLE, OF ATHENS, OHIO

PHOTOGRAPHIC EXPOSURE METER

Application filed June 18, 1929. Serial No. 371,905.

This invention relates primarily to improvements in photographic exposure meters for measuring, in terms of exposure periods, the intensity of light rays proceeding from a certain source, for example, an object or scene to be photographed, and has as one of its main objects the provision of a meter which can be conveniently used to measure or indicate, with remarkable accuracy, the length of the exposure period in accordance with the lens aperture employed, the speed of the sensitized medium to be exposed; and likewise in accordance with the intensity of the light rays reflected from a portion of the subject to be photographed and which portion is selected at the discretion of the photographer. The invention thus contemplates the accuracy unattainable by the use of exposure meters which depend for their calculations of the exposure period upon the prevailing illumination or upon the strength of light proceeding from the general direction of the object or scene to be photographed.

With the further novel object in view to provide an exposure meter of versatile utility, there is incorporated in its construction as one of its main basic features, a unique combination of interrelated parts whereby an extremely wide variation of exposure computations are readily available with equal facility and accuracy in the use of both the still and motion picture types of camera.

The invention also contemplates another practical innovation in the provision of a scale, in combination with the vernier focusing arrangement, which automatically determines the approximate anterior conjugate focal distance simultaneously with the simple operation of ascertaining the correct exposure period. This distinctive feature effectively eliminates an additional troublesome problem in camera operation whenever means for visual focusing are unavailable.

Other objects of the invention are: the provision of an instrument of elegant design, simplicity of parts and assembly, and convenience of operation.

The meter embodying the invention is intended to be focused on a portion of the subject to be photographed and means are provided for displaying a monochromatic image of the part selected in the perspective plane of the lens system, and to focus diffused light rays of a corresponding color, reflected from the other focused parts of the subject, onto contiguous light transmitting comparators, selectively adjustable and of varying densities, an adjustment of certain members which carry the said comparators permitting of the photographer matching the coadjacent light densities and, by means to be presently explained, immediately determining automatically the period of exposure in accordance with the lens aperture selected and the speed of the sensitized medium to be exposed.

With the foregoing and other objects in view, the invention consists in the details of construction and combination of parts to be hereinafter described and set forth in the subjoined claims.

In describing the invention in detail, reference will be had to the accompanying drawings, wherein like characters of reference denote corresponding parts in the several views, and in which, Figure 1 is a horizontal sectional view through the exposure meter embodying the invention, and is taken substantially on the line 1—1 of Fig. 2, looking in the direction indicated by the arrows;

Figure 2 is a vertical view, partly in section, the transverse portion of which is taken substantially on the line 2—2 of Fig. 1, looking in the direction indicated by the arrows;

Figure 3 is a pictorial representation, in rear projection, of the light transmitting variable comparators and the actuating assembly unit;

Figure 4 is a section on line 4—4 of Fig. 2 and represents a side projection of the right supporting plate showing the relative arrangement of the actuating gears for the time period of exposure series of light transmitting comparators;

Figure 5 is a side elevation, partly in section, and illustrates the vernier focusing mechanism of the device, and the correlated scale of anterior conjugate focal distances, as viewed from point 5—5 of Fig. 1, looking in the direction indicated by the arrow;

Figure 6 is a side projection of the left supporting plate, companion to plate illustrated in Fig. 4, and shows the relative compound arrangement of actuating gears for both the lens aperture and film speed series of variable light transmitting comparators;

Figure 7 is a perspective view of the correlated unit of variable light transmitting comparators and shows their group relation to both the light ray conducting tunnel and the assembly partition walls;

Figure 8 is a transverse sectional view taken substantially on the line 8—8 of Fig. 1, looking in the direction indicated by the arrows and illustrates the graduated light transmitting screen-filter;

Figure 9 illustrates a portion of the variable light transmitting comparator series showing the speed of the film or plate and indicia associated therewith as an integral part of the comparators;

Figure 10 represents a portion of the variable light transmitting comparators showing the series of time period of exposure and indicia associated therewith as an integral part of each comparator series;

Figure 11 illustrates a portion of the variable light transmitting comparators showing the lens aperture or stops and indicia associated therewith as an integral part of the comparators; and Figure 12 is a perspective view of the device assembled.

The meter comprises a casing which is indicated in general by the numeral 1 and which may be of any suitable exterior contour to accommodate the assembly units to be subsequently mounted therein. The casing is provided at its front with a barrel extension 2 onto which is rotatively fitted a lens barrel 3 having engagement at its rear end, at 4, with a spiral recess portion 5 of the barrel extension 2 to permit focusing of an objective 6. The casing is provided intermediate its front and rear ends with a rectangular box-like structure having semicircular projections at its top and bottom, which are sectioned to facilitate assembly of the instrument, and eye piece 7 is located at the rear of casing and has mounted therein a magnifying lens 8, the principal axis of which is in alinement with the principal axis of the objective 6. At both the front and rear of the intermediate structure, rectangular openings are provided on each side of the barrel extension 2 and the eye piece 7, respectively, to permit exterior accessibility to milled finger flanges which provide means for selective, independent, simultaneous adjustment of the parts which are assembled separately, as illustrated in Fig. 3.

Essentially allied to the vernier-like arrangement for focusing of the instrument, see Fig. 5, is a correlated scale of anterior conjugate focal distances which is definitely related to the foci of the objective and which determines automatically, with sufficient accuracy for all practical requirements, the distance in feet, (or yards, or meters) to the object point when the image, in the perspective plane of the objective, has been sharply defined. The manner in which this result is accomplished is now explained.

If an objective is focused on a thing situated a moderate distance from the lens, other objects situated near or distant from the lens are out of focus. If a focus be made on nearer objects, one after another, the optical axiom applies, that as the object is brought toward the lens, the image recedes away from the lens, and the further the lens, the more slowly does the image recede as the object moves, while as the object approaches near to the lens, the image recedes more rapidly from the lens. A change in distance between lens and object causes a relative change in distance between lens and image, and the image moves in the same direction as the object.

It is an invariable optical law that for every distance between lens and image (posterior conjugate focal distance), there is a certain corresponding distance between lens and object (anterior conjugate focal distance) these distances being conjugate or inseparably yoked together.

It will be readily apparent that if barrel extension 3, Fig. 1, is rotated clock-wise, for example, due to the spiral focusing device, the distance between the objective 6 and the perspective plane 10 will be diminished. It logically follows that for every conjugate focal distance, fixed positions may be established on lens barrel 3, (Fig. 5) and on barrel extension 2, which will coincide alternately if the barrel 3 be manually rotated to indicate the linear measurement or axial extent of such focal distance.

Consequently, if the minor conjugate focal distance or image point is altered, its corresponding major conjugate focal distance or object point will simultaneously be changed, relative to the objective, and the linear extent of the intermediate distance may be clearly indicated by a scale similar to the one illustrated in Fig. 5, whereby a distance of eight feet or units between the lens and the object focused upon has been computed.

Arranged within the barrel extension 2 is a monochromatic light ray transmitting screen-filter 11 which may be of any material which will permit a maximum amount of diffused light to enter the casing in the rear of the combination. This light transmitting medium is of a primary color, for example, blue, and is graduated and translucent throughout its entire area except a small rectangular portion of its area indicated at 12 which is substantially transparent or clear. In other words, except for this portion, one surface is etched or otherwise treated so as to possess sufficient density to disperse the light rays passing therethrough. As a means of compensation for the loss of illuminating power in this area, due to the diffusing property, the screen-filter is graduated in color or density, the more dense portion being in the clear area 12 illustrated in Fig. 8 of the drawings.

The remaining parts of the device are assembled into a separate unit, Fig. 3, which comprises a right 13 and a left 14 supporting plate, provided with suitably located bearings and circular rim projections integral, between which are horizontally arranged three pairs of dually coordinated cylindrical carriers, having axles or central shafts which extend through the supporting plates, as shown in Fig. 2.

Arranged within the central area of these supporting plates is a sub-unit (Fig. 7) comprising a partition wall 15 and a companion wall 16 which perform the dual function of supporting the light ray conducting tunnel 17 and holding the completed assembly rigidly in alinement. Provision is made in each supporting plate for countersunk screws 18 which secure the partition walls perpendicular to each supporting plate which are obviously parallel to and in alinement with each other and at right angles to the three carrier units which they support. These screws 18 extend through supporting plates 13 and 14 and each enters a threaded recess 18ª which recesses are in the ends of each partition wall 15 and 16.

Means for the synchronous rotation of each pair of the carriers is as follows:

Ends of the axial shafting provided as an integral part of each drum extend through the supporting plate 13 and securely attached thereon, by means shown in Figs. 2 and 4, are transmission gears 20 which engage with the intermediate gears 21 which idle at 19 or turn freely upon the protruding shaft of one of each of the other carrier units, as indicated.

In Fig. 2 the annular milled finger flange 23 is provided integral with a main shaft 24 and driving gear 25 and is rotatively mounted upon the circular rim projection of the supporting plate 13, the driving gear 25 being thus in alinement and mesh with the intermediate gear 21, with the main shaft 24 at rest in the bearing 26, as illustrated.

Referring to Fig. 4, it will be evident that if the driving gear 25 is rotated, through adjustment of finger flange 23 via the main shaft 24, in a clock-wise direction, the intermediate gear 21 will move counter clock-wise while the transmission gears 20 rotate simultaneously, each conveying a related carrier member in the same direction as the applied power impulse.

The other carrier units are actuated in a similar manner, it being observed, however, in Fig. 6, that as there are no intermediate gears, the power is transmitted from the driving gears 29 and 31 directly to the transmission gears of each respectively allied system.

Again referring to Fig. 2, it will be observed that the milled finger flange 27 is provided integrally with a main shaft 28, and driving gear 29, upon which are rotatively mounted a tubular sleeve bearing, molded axially of the flanged disks and driving gear 31, which are integral to the milled flange 32, rotatively mounted upon the circular projecting rim of supporting plate 14 having a step-cut joint 33, (Fig. 6), to permit its functioning also as an internal expansion brake against accidental rotation of the related finger flange 32. It will be observed that the milled flanges 27 and 32 may be rotated independently or simultaneously without interfering with each other. Likewise their respective associated system of actuating gears and related carriers revolve without interference by reason of the first mentioned group being in juxtaposition to the accompanying supporting plate, and the last mentioned system laterally displaced, as illustrated in Fig. 6.

Figures 9, 10 and 11 show portions of transparent film-like forms from which there is removed a central area of uniform width throughout their entire length, except for a small portion at each extreme end, along the resultant borders of which are arranged a variable series of light transmitting comparators which increase progressively in density from beginning to end of each series, and correlated to the comparators are indicia defining the value of its relation to the unit it represents. Referring to Fig. 10, it will be observed that there is a numeral associated with each individuated comparator, whereas in Figs. 9 and 11, there are dual comparators for each individuated indicia. In other words, all of the comparators in the first mentioned series are of unlike density, whereas in the latter there are two comparators of like density in each series, and these comparators are situated directly opposite each other in their respective units. The one series of transparencies represents the speed of the film or plate, and the other series, lens aperture or shutter stops.

The time period of exposure series of transparencies is illustrated in Fig. 10, showing that the opaque portions bearing the indicia are centrally arranged, whereas in the previously described comparator forms, the opaque portions are situated in the right and left margins of their related units.

If the three series of comparator forms are superimposed in registration, (see Fig. 7), it will be evident that as a result of each opaque portion occupying an individuated position in the assembly, respective to the opaque portions of the associated forms, a minimum amount of extraneous light is admitted and no obstruction to the presentation of the indicia is permitted in their entirety.

A light ray conducting tunnel 17 is essentially allied to the comparator combination unit 38 and is supported largely by the partition wall 15, positioned with its forward or larger end in exact registration with the transparent area 12 of the light transmitting screen-filter previously described, to conduct image bearing rays of light focused by the objective 6 directly to the perspective aperture 10 situated centrally within the perspective plane of the objective 6. The boundaries of this aperture are confined to the inside dimensions of the rearward or tapered end of the light ray conductor which extends intermediate the transparent variable comparator series and effects complete contact between the object image 10 confined therein, and the unit 38 of the combined variable comparators situated in substantially the same vertical plane on each side. This readily permits a comparison of the relative densities by virtue of the diffused light rays passing alongside the light ray conducting tunnel from the translucent area of the combination screen-filter and which are selectively transmitted by the variable light intensity comparators.

Tapering of the vertical inside walls of the light ray conductor 17 to an imperceptible thickness (Fig. 7) at its rearward or smaller end, which is substantially in horizontal alinement with the combination unit 38, is an essential feature to permit of the most efficient comparison of the relative densities in the interdependent areas of illumination.

Mounted upon each pair of the rotatively adjustable carriers, (Fig. 1), is the flexible film-like material which conveys a dual series of variable transparent light intensity comparators having valuated individuated indicia as an integral part of each series, representing the speed of film or plate 34, the time period of exposure 35, and the lens aperture 36, respectively.

A practical means of secure attachment of the comparator forms to their related conveyers is indicated in Fig. 1, showing that each end portion of the tissue is looped around the shafting previous to an exterior emergence by way of the horizontal aperture in each carrier provided therein for entrance of the tissue, the extreme end of which is subsequently pressed into a dovetail recess 37 provided in the annular center portion of each conveyer member, as also illustrated in Fig. 3.

It has been previously indicated that the purpose of the light intensity comparators is to display in the field of vision through the eye piece lens 8, variable radiation of diffused illumination and indicia associated therewith, this being accomplished in the following described manner of using the exposure meter.

Assuming that a film or plate speed classified as 800 is to be exposed and the lens aperture 4.5 having been selected, the instrument is directed at a portion of the subject to be photographed, the barrel 3 being adjusted as required to obtain the desired focus. The milled finger flange 27, Fig. 3, is then rotated until the numeral 800 appears in the window 40 of the wall 16. Likewise the milled finger flange 32 is adjusted so as to cause the lens aperture indicating ordinal 4.5 to appear in the window 41 of the wall 16.

An optical image of a portion of the subject to be photographed will have appeared within the perspective aperture 10 situated interjacent. It will also be observed that on each side of the aperture 10 there are luminiferous areas 38 which will be visibly affected, relative to density, whenever the finger flange 23 is rotated. As the comparators are actuated, the two diffused light areas 38 are examined alternately and a selective matching of their visual gradation to the relative denser portion of the interposed object image is readily accomplished, the indicia representing the time period of exposure being simultaneously visible in the window 42 of the wall 16. In the present example, the exact duplication of density is obtained in the comparator which denotes that 1/5 second is the correct exposure period in combination with the 800 speed of film and the 4.5 lens aperture comparators previously applied.

Manifestly a variation of diffused light radiation may be obtained in the areas 38 by rotating any of the three milled finger flanges. This distinctive basic feature of the invention also permits its ready adaptability to the motion picture exposure problem, wherein it is essentially desirable to use definite shutter speeds and to select a lens aperture which will admit a proper amount of light rays to produce the desired result.

In this class of photography, the instrument is focused as previously described. Selecting the same speed of film and lens aperture readings, the finger flange 27 (Fig. 3) is rotated until the speed ordinal 800 appears in the window 40, as illustrated. If the exposure period is to be 1/5 second, for example, the finger flange 23 is rotated until the time indicating fraction appears in the window 42, as shown. As the finger flange 32 is then rotated, each of the radiating translucent areas 38 assumes a variation of intensity. A selective matching of relative densities obviously occurs between the object image and the comparator unit which carries the indicated time period of exposure selected. Consequently, when the densities are duplicated, as illustrated, the proper lens aperture which, in the present example is 4.5, is displayed in the window 41, as shown.

Furthermore, the variable comparators being in flexible film-like form permit the capacity of my exposure meter to be extended far beyond the usual requirements. It is not, however, necessary to make the time period series of greater length than the others due to the practicability of the meter wherein the time periods may be extended to include 30 seconds, after which period the speed series of comparators may be adjusted to permit continuation of the exposure period if desired. This is accomplished as follows:

Should it occur that none of the time element comparators are sufficient to duplicate density of the adjacent object image, the speed element series may be adjusted until the desired result is obtained and 10 seconds added to the 30 seconds for each lower speed number used. For example, if the 30 second time comparator is insufficient with the 800 speed comparator in conjunction, the former remains stationary and the latter then actuated to a satisfactory result, this being procured, in the present instance, by the use of the speed comparator 700. To the 30 seconds would be added 10 seconds for each of the 750 and 700 speed comparators, making a total exposure period of 50 seconds. It will be understood that this procedure may be applied to the entire speed series of comparators.

This practical feature may be utilized advantageously to compensate for the discrepancy in certain types of photographic shutters or to readily obtain a desired result in a purposely made over or under exposure.

It must be understood that only the preferred embodiment of my invention is herein shown and described and that any departure from the same, such as in size, shape or arrangement of parts, may be resorted to without departing from the spirit of the invention or the scope of the subjoined claims.

What I claim and desire to secure by Letters Patent of the United States is:

1. A photographic exposure meter comprising a casing, a lens system, a plurality of superimposed movably mounted light density comparators comprising flexible webs having on their surfaces gradient scale readings indicative of major film speeds by means of the passage of light rays through the lens system and aforesaid comparators.

2. A photographic exposure meter comprising a casing, a lens system, a plurality of superimposed movably mounted light density comparators comprising flexible webs having on their surfaces indicia which are indicative of different lens aperture by means of the passage of light rays through aforesaid lens system and aforesaid comparators and indicia on the said webs arranged longitudinally thereof, the indicia on the several superimposed webs being disposed in stepped relation to the indicia on the other webs.

3. A photographic exposure meter comprising a casing, an objective and eye piece magnifying lens adapted to object focusing, valuated, transparent, flexible webs, means for movably supporting the webs in superposed relation to one another, and means for moving said webs with relation to the lens and to one another and a combination light ray screen-filter having a relatively small transparent area, the remainder of said screen filter being translucent and graduated as to density interposed to said lenses for simultaneously transmitting diffused and undiffused portions of light rays admitted by said objective, and thereby render a composite monochromatic optical impression discernible through the said eye piece lens, and means for varying the dispersed light rays to correspond to the separately transmitted perspicuous light rays.

4. A photographic exposure meter comprising a casing, an objective and eye piece lens system, plural elongated flexible and superimposed light density comparators, individuated, descriptive indicia inseparable from each of the comparators, a graduated monochromatic screen-filter, a tubular light ray conductor rotatably mounted, and dually coordinated cylindrical carriers for moving the aforesaid comparators which are productive of valuated scale readings indicative of film speed, lens aperture and the time period of exposure.

5. A photographic exposure meter including a variable focus lens system, a plurality of elongated flexible movable transparent light density comparators having valuated indicia for the different light density parts indicative of film speed, the indicia on one superimposed comparator being out of line with the indicia of the other superimposed comparators, exposure time or lens aperture, a light transmiting filter, a tapered light ray conductor, cylindrical carriers for the comparators, means for moving said carriers in synchronous rotation, a vernier means associated with the lens system for indicating anterior conjugate focal distances, and an approximate scale associated with said means and aforesid lens system for indicating the linear extent or measurement of a major focal distance.

6. A photographic exposure meter comprising a casing, an objective and eye piece magnifying lens adapted to object focusing, valuated transparent flexible webs, means for holding superimposed webs for movement in the field of the lenses and relative to each other, means for moving a plurality of superimposed webs in relation to the lenses and to each other, and a combination light ray screen-filter having a relatively small transparent area, the remainder of said screen filter being translucent and graduated as to density interposed to said lenses for simultaneously transmitting diffused and undiffused portions of light rays admitted by said objective, and thereby render a composite monochromatic optical impression discernible through the said eye piece lens, and means for varying the dispersed light rays to correspond to the separately transmitted perspicuous light rays.

GUY E. OSBORNE.